United States Patent
Solecky et al.

(10) Patent No.: US 7,571,070 B2
(45) Date of Patent: Aug. 4, 2009

(54) MEASUREMENT SYSTEM FLEET OPTIMIZATION

(75) Inventors: Eric P. Solecky, Hyde Park, NY (US); Charles N. Archie, Granite Springs, NY (US); George W. Banke, Jr., Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/468,482

(22) Filed: Aug. 30, 2006

(65) Prior Publication Data

US 2008/0114566 A1 May 15, 2008

(51) Int. Cl.
G06F 15/00 (2006.01)
(52) U.S. Cl. .................. 702/121; 702/118; 702/117
(58) Field of Classification Search .................. 700/123, 700/143, 173; 702/121, 117, 118; 438/6, 438/8, 11, 12, 13
See application file for complete search history.

(56) References Cited

U.S. PATENT DOCUMENTS

| | | | |
|---|---|---|---|
| 6,044,335 A * | 3/2000 | Ksendzov | 702/182 |
| 6,456,894 B1 | 9/2002 | Nulman | |
| 6,586,265 B2 | 7/2003 | Chiou et al. | |
| 6,671,570 B2 | 12/2003 | Schulze | |
| 7,318,206 B2 * | 1/2008 | Brendler et al. | 716/4 |
| 7,340,374 B2 * | 3/2008 | Archie et al. | 702/179 |
| 7,353,128 B2 * | 4/2008 | Archie et al. | 702/85 |
| 2001/0027354 A1 | 10/2001 | Kakino et al. | |
| 2002/0099462 A1 | 7/2002 | Gurrola-Gal et al. | |
| 2003/0176940 A1 | 9/2003 | Rangachari et al. | |
| 2004/0044435 A1 | 3/2004 | Hellig et al. | |
| 2004/0173464 A1 | 9/2004 | Parikh et al. | |
| 2004/0220688 A1 | 11/2004 | Behrisch et al. | |
| 2005/0010319 A1 | 1/2005 | Patel et al. | |
| 2005/0052197 A1 | 3/2005 | Watkins | |
| 2005/0136560 A1 | 6/2005 | Helwig | |
| 2006/0195295 A1 * | 8/2006 | Archie et al. | 702/179 |

OTHER PUBLICATIONS

Snedecor, et al., "Statistical Methods: One-Way Classifications.—Analysis of Variance", Ames, Iowa, pp. 296-298.

Duncan, "Quality Control and Industrial Statistics," Homewood, Illinois, 1965—pp. 641-644.

U.S. Appl. No. 11/065,740, filed Feb. 25, 2005, Tite: Determining Fleet Matching Problem and Root Cause Issue for Measurement, Applicant: Solecky, et al.

(Continued)

*Primary Examiner*—Edward R Cosimano
*Assistant Examiner*—Douglas N Washburn
(74) *Attorney, Agent, or Firm*—Todd M. C. Li; Hoffman Warnick LLC

(57) ABSTRACT

A method, system and program product are disclosed for optimizing a fleet of measurement systems. One embodiment determines a tool matching precision (TMP) and a fleet measurement precision (FMP) and normalizes these metrics across applications. An optimization is carried out in which usage weighting factors are assigned to each measurement system while enforcing usage enforcement rule(s) to ensure that each measurement system is optimally used and each application is adequately covered. The optimization re-assigns usage weighting factors to minimize a normalized FMP metric and enforce the usage enforcement rule(s).

20 Claims, 3 Drawing Sheets

OTHER PUBLICATIONS

U.S. Appl. No. 11/245,865, filed Oct. 7, 2005, Title: Determining Root Cause of Matching Problem and/or Fleet Measurement Precision Problem for Measurement System, Applicant: Solecky, et al.
"Metrology Tool Fleet Management: Applying FMP Tool Matching And Monitoring Concepts To An Overlay Fleet" Morningstar, et al.—Metrology, Inspection, and Process Control for Microlithography XX, edited b Chas N. Archie, Proc. of SPIE vol. 6152, 615212, (2006) pp. 615212-1-615212-11.

* cited by examiner

MEASUREMENT SYSTEM FLEET OPTIMIZATION

BACKGROUND OF THE INVENTION

1. Technical Field

The invention relates generally to manufacturing measurement system analysis, and more particularly, to a method, system and program product for optimizing a fleet of measurement systems.

2. Background Art

Methodologies have been described for the assessment and maintenance of a fleet of measurement systems or tools within a manufacturer. The focus of these methodologies has been on a fleet of measurement systems for a single application. While prior approaches use measurement systems as an example, the methodologies can also be extended to processing equipment or tools. One approach to assessment includes calculating measurement system under test (MSUT) tool matching precision (TMP), in U.S. Pat. No. 7,340,374, which is hereby incorporated by reference. Once the TMPs of a fleet of measurement systems have been determined, then a fleet measurement precision (FMP) may be calculated, which is also disclosed in U.S. Pat. No. 7,340,374. Methods to reduce FMP by evaluating components of variance that comprise each measurement system's TMP may also be employed. The above-identified metrics employ two metrics besides the conventional measures of precision and offset, i.e., SISoffset and non-linearity. If TMP and/or FMP fail when qualifying measurement systems, these metrics provide guidance on what needs to be addressed on the MSUT for the given application thereby guiding the metrology engineer on where to start diagnosing for the root cause of the matching issue. Techniques for determining a root cause through noting which of the four contributors to matching, i.e., precision, offset, SISoffset and non-linearity, is highest, or the combination of metrics is highest, may also be employed, as also described in U.S. Pat. No. 7,340,734. A root cause database in which characteristics of matching issues are associated with a signature to further refine the root cause determination may also be employed, as disclosed in U.S. 2006/0195295, which is hereby incorporated by reference.

One challenge relative to optimizing a fleet of measurement systems, however, is not having a manner of normalizing different metrics for measurement systems across different applications for comparison. In particular, common practice treats all measurement systems as equivalent, assigning product to measurement systems solely based on availability. Conventional practices also employ a measurement system dedication approach in which a measurement system is dedicated to a particular application. For example, for a particularly challenging application, the best measurement system is assigned to be the only measurement system to make the measurements. Historically, the best measurement system was determined based on single measurement system precision. Unfortunately, measurement system dedication is inefficient and can actually lead to an overall degradation of the average FMP of the fleet across all applications. Having a way to normalize different measurement systems across different applications for comparison and optimizing the fleet based on the normalized values, therefore, would be helpful.

SUMMARY OF THE INVENTION

A method, system and program product are disclosed for optimizing a fleet of measurement systems. One embodiment determines a tool matching precision (TMP) and a fleet measurement precision (FMP) and normalizes these metrics across applications. An optimization is carried out in which usage weighting factors are assigned to each measurement system while enforcing usage enforcement rule(s) to ensure that each measurement system is optimally used and each application is adequately covered. The optimization re-assigns usage weighting factors to minimize a normalized FMP metric and enforce the usage enforcement rule(s).

A first aspect of the invention provides a method of optimizing a fleet of measurement systems, the method comprising: obtaining an application tolerance (T) for each application to which at least one measurement system of the fleet is to be exposed; determining a tool matching precision (TMP) for each measurement system in the fleet for each application to which a measurement system is exposed; and optimizing the fleet by: a) determining a usage weighting factor ($w_{ij}$) for each measurement system (i) for each application representative of a time the measurement system (i) spends performing a particular application (j) and calculating at least one usage enforcement rule, b) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors, c) calculating a normalized FMP metric, the normalized FMP metric equivalent to a root weighted average square of the weighted FMP metric divided by the application tolerance across all applications, and d) re-assigning the usage weighting factors to minimize the normalized FMP metric for all applications while enforcing the at least one usage enforcement rule.

A second aspect of the invention provides a system for optimizing a fleet of measurement systems, the method comprising: an obtainer for obtaining an application tolerance (T) for each application to which at least one measurement system of the fleet is to be exposed; a tool matching precision (TMP) determinator for determining a tool matching precision (TMP) for each measurement system in the fleet for each application to which a measurement system is exposed; and an optimizer for optimizing the fleet, the optimizer including: a) a weight assigner for determining a usage weighting factor ($w_{ij}$) for each measurement system (i) for each application representative of a time the measurement system (i) spends performing a particular application (j) and calculating at least one usage enforcement rule, b) a fleet measurement precision (FMP) calculator for: i) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors, and ii) calculating a normalized FMP metric, the normalized FMP metric equivalent to a root weighted average square of the weighted FMP metric divided by the application tolerance across all applications; and c) a minimizer for invoking the weight assigner to re-assign the usage weighting factors to minimize the normalized FMP metric for all applications while enforcing the at least one usage enforcement rule.

A third aspect of the invention provides a program product stored on a computer-readable medium, which when executed, optimizes a fleet of measurement systems, the program product comprising: program code for obtaining an application tolerance (T) for each application to which at least one measurement system of the fleet is to be exposed; program code for determining a tool matching precision (TMP) for each measurement system in the fleet for each application to which a measurement system is exposed; and program code for optimizing the fleet, the optimizing program code including: a) program code for determining a usage weighting factor ($w_{ij}$) for each measurement system (i) for each application representative of a time the measurement system (i) spends performing a particular application (j) and calculating at least one usage enforcement rule, b) program code for: i) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors, and ii) calculating a normalized FMP metric, the normalized FMP metric equivalent to a root weighted average square of the weighted FMP metric divided by the application tolerance across all applications; and c) program code for invoking the weight assigner to re-assign the usage weighting factors to minimize the normalized FMP metric for all applications while enforcing the at least one usage enforcement rule.

A fourth aspect of the invention provides a computer-readable medium that includes computer program code to enable a computer infrastructure to optimize a fleet of measurement systems, the computer-readable medium comprising computer program code for performing the method steps of the invention.

An fifth aspect of the invention provides a business method for optimize a fleet of measurement systems, the business method comprising managing a computer infrastructure that performs each of the steps of the invention; and receiving payment based on the managing step.

A sixth aspect of the invention provides a method of generating a system for optimize a fleet of measurement systems, the method comprising: obtaining a computer infrastructure; and deploying means for performing each of the steps of the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
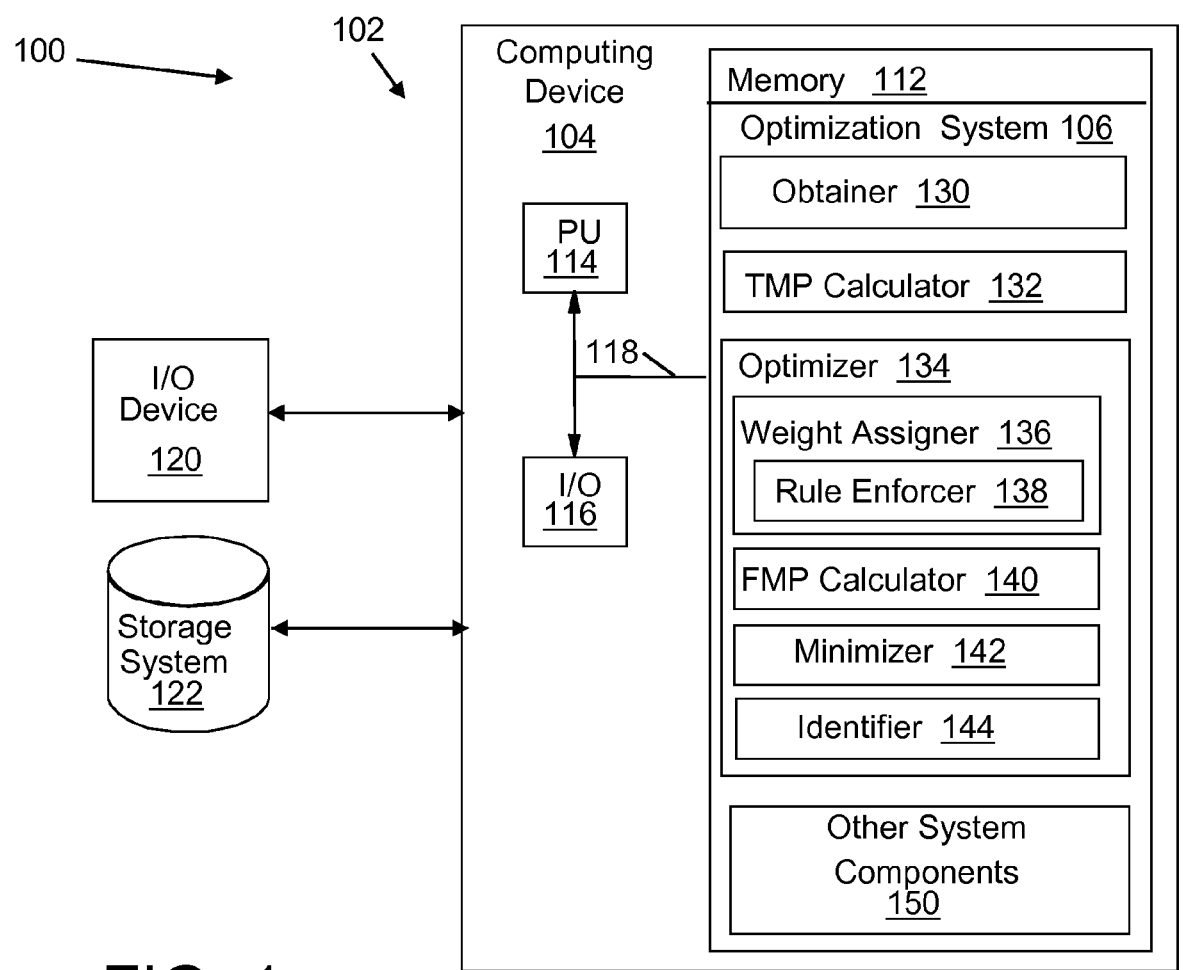
FIG. 1 shows a block diagram of one embodiment of an optimization system according to the invention.

The description includes the following headings for clarity purposes only: I. Introduction and Definitions, II. System Overview, III. Operational Methodology, and IV. Conclusion.

I. Introduction and Definitions

A method, system and program product for optimizing a fleet of measurement systems are described herein. In one embodiment, the teachings of the invention are applicable to measurement systems. A "measurement system" or "measurement system under test" (hereinafter "MSUT") (denoted i) can be any tool or group of tools used for measuring, such as a critical dimension scanning electron microscope, an atomic force microscope, scatterometer, etc. Accordingly, it should be recognized that while particular types of measurement systems may be mentioned in the description, the teachings of the invention are applicable to any type of measurement system. In addition, while the invention will be described in the setting of the semiconductor industry, and in particular to critical dimension measurement systems, it should be recognized that the teachings of the invention are applicable to any industry or measurement system where measurement uncertainty is present and more than one measurement system is used to control a manufacturing setting, e.g., a manufacturing line. Similarly, a "fleet" including at least one measurement system may include a variety of measurement systems. (A fleet may include a mixed fleet of multiple generations of tools from the same supplier as well as a fleet of tools from multiple suppliers.) Furthermore, the teachings of the invention are not limited to measurement systems, and may be applied to any processing or manufacturing measurement systems and/or fleet. As one with skill in the art will recognize, the metrics disclosed in other applications may be modified to accommodate tools other than measurement systems.

"Application" (j) is one or more situations in which a measurement system may be used and is capable of operating.

"Application tolerance" (T) is an acceptable product variation for a particular application.

"Tool matching precision" (TMP) is a metric that results from a regression analysis that compares measurements from the MSUT and a chosen benchmark measurement system (BMS), as defined in U.S. Ser. No. 11/065,740. As described therein, in one embodiment, TMP is defined using this set of parameters as:

$$TMP = 3\sqrt{\beta_{MSUT}^2 \sigma_{MSUT}^2 + (\text{offset} - \text{offset}_{BMS})^2 + (SISoffset - SISoffset_{BMS})^2 + \sigma_{non\text{-}linearity}^2},$$

where TMP is the tool matching precision, $\beta_{MSUT}$ is the slope of the Mandel regression analysis, $\sigma_{MSUT}$ is the precision of the MSUT, offset is the average offset (between the MSUT and the BMS), offset$_{BMS}$ is the benchmark measuring system (BMS) average offset (between the BMS and the fleet average), SISoffset is the slope-induced shift offset, SISoffset$_{BMS}$ is the BMS shift-induced offset, and $\sigma_{non\text{-}linearity}$ is the non-linearity.

"Normalized TMP metric" is a metric to normalize TMP across different applications and is equivalent to TMP for a given measurement system (i) for an application (j) divided by the application's tolerance $T_j$, i.e., $TMP_{ij}/T_j$.

"Fleet measurement precision" (FMP) is a metric that provides an indication of the fleet's overall measurement precision for a given application (j), as defined in U.S. Ser. No. 11/065,740. In that patent application, FMP was calculated using equal usage weighting for each measurement system. That is, each measurement system was considered to carry an equal load.

"Usage weighting factor" ($w_{ij}$) is a representation of the time the measurement system (i) spends performing a particular application (j).

"Measurement system weight" ($M_i$) represents a time spent by measurement system (i) performing all applications. The measurement system weight for measurement system (i) can be calculated according to the following equation:

$$M_i = \sum_{j=1}^{M} w_{ij} \qquad \text{(Eqn. 1)}$$

In this equation, M is the total number of applications.

"Application weight" ($N_j$) represents a time spent by all measurements systems performing application (j). The application weight for application (j) can be calculated according to the following equation:

$$N_j = \sum_{i=1}^{N} w_{ij} \qquad \text{(Eqn. 2)}$$

In this equation, N is the total number of measurement systems in the fleet

"Weighted FMP metric" is a metric that provides an indication of the fleet's overall measurement precision for a given application (j) based on usage weighting factors. The weighted FMP metric can be calculated according to the following equation:

$$FMP_j = \sqrt{\frac{1}{N_j} \sum_{i=1}^{N} w_{ij} TMP_{ij}^2} \qquad \text{(Eqn. 3)}$$

where $FMP_j$ is the weighted FMP metric for application (j), N is the number of measurement systems in the fleet, $w_{ij}$ is a usage weighting factor for measurement system (i) for application (j), and $TMP_{ij}$ is a TMP for measurement system (i) for application (j).

"Weighted normalized TMP metric" represents the relative contribution of measurement system (i) to the weighted FMP metric for application (j), and can be calculated according to the following equation:

$$\left(\frac{TMP_{ij}}{T_j}\right)_{wt} = \sqrt{w_{ij}} \frac{TMP_{ij}}{T_j}. \qquad \text{(Eqn. 4)}$$

"Normalized FMP metric" is a metric to normalize FMP across different applications for the fleet and is equivalent to a root weighted average (mean) square of the weighted FMP metric ($FMP_j$) divided by the application tolerance ($T_j$) across all applications. The following equation represents the normalized FMP metric:

$$\left(\frac{FMP}{T}\right)_{ras} = \sqrt{\frac{\sum_{j=1}^{M} N_j (FMP_j / T_j)^2}{\sum_{j=1}^{M} N_j}} \qquad \text{(Eqn. 5)}$$

where $(FMP/T)_{ras}$ is the normalized FMP metric, M is the total number of applications to which the fleet will be exposed, $FMP_j$ is the FMP for application (j) and $T_j$ is the application tolerance for application (j).

II. System Overview

Turning to the drawings, FIG. 1 shows an illustrative environment 100 for optimizing a fleet of measurement systems. To this extent, environment 100 includes a computer infrastructure 102 that can perform the various process steps described herein for optimizing a fleet of measurement systems. In particular, computer infrastructure 102 is shown including a computing device 104 that comprises an optimization system 106, which enables computing device 104 to optimize a fleet of measurement systems by performing the process steps of the invention.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as optimization system 106, that is stored in memory 112 and/or storage system 122. While executing computer program code, processor 114 can read and/or write data, such as optimization, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices.

In any event, computing device 104 can comprise any general purpose computing article of manufacture capable of executing computer program code installed by a user (e.g., a personal computer, server, handheld device, etc.). However, it is understood that computing device 104 and optimization system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, optimization system 106 enables computing infrastructure 102 to optimize a fleet of measurement systems. To this extent, optimization system 106 is shown including an obtainer 130, a TMP calculator 132 and an optimizer 134. Optimizer 134 is shown including a weight assigner 136 having a rule enforcer 138, a FMP calculator 140, a minimizer 142, an identifier 144 and other system components 150. Other system components 150 may include peripheral functions not expressly described herein, but essential to optimization system 106 operation. Operation of each of these systems is discussed further below. However, it is understood that some of the various systems shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

III. Operational Methodology

Figure 2:
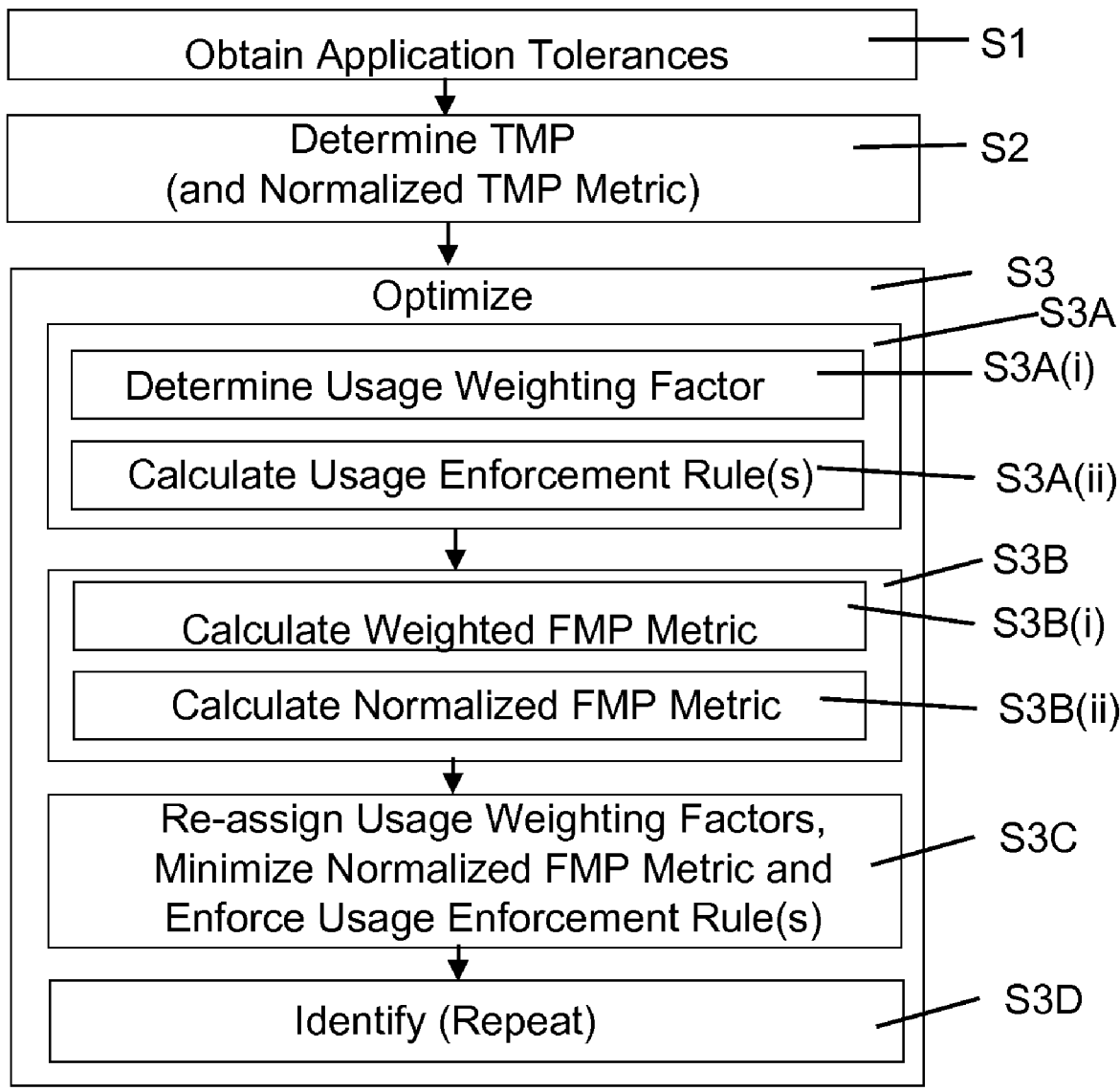
FIG. 2 shows a flow diagram of one embodiment of an operational methodology of the system of FIG. 1.

Referring to FIG. 2, one embodiment of an operational methodology will now be described in conjunction with FIG. 1. It is understood that while a particular order of functions has been illustrated, the order may be altered from that shown. In the embodiments described herein, it is assumed that a fleet of N measurement systems is being used for M applications.

In S1, obtainer 130 obtains an application tolerance ($T_j$) for each application (j) to which at least one measurement system (i) of the fleet is to be exposed. An application tolerance may be stated in any now known or later developed fashion, e.g., a percent error, an acceptable plus-minus value, etc. Application tolerances may be obtained in any now known or later developed fashion, e.g., they may be input by a user, recalled from a database, calculated based on other data, etc.

In S2, TMP calculator 132 determines a TMP for each measurement system in the fleet for each application to which a measurement system is exposed. As stated above, according to one embodiment, TMP may be calculated as defined in U.S. Ser. No. 11/065,740. As an option, TMP calculator 132 may also calculate a normalized TMP metric for each measurement system for each application. As stated above, according to one embodiment, the normalized TMP metric is equivalent to TMP for a given measurement system (i) for an application (j) divided by the application's tolerance $T_j$, i.e., $TMP_{ij}/T_j$. This normalized TMP metric may be helpful for comparison of TMP across different applications, as will be described in more detail below.

The normalized TMP metric may be impacted for a measurement system for a particular application for two reasons. One reason is differences in performance, perhaps due to measurement system manufacturing tolerances, perhaps due to different environment settings for the measurement systems, differences in the aging of component parts, or something else. The second reason for the differences in the normalized TMP metric performance is measurement assessment uncertainty (also called error). If the measurement assessment error is much larger than the real differences in performance, then it is not advisable to adjust measurement system usage since the measured differences are not real. This understanding drives the need to ensure that the measurement assessment uncertainty is a small contributor to the distribution of the normalized TMP metric. When this is the case, measurement systems situated in the outskirts of the distribution are either truly worse or better performers compared to the average for the application.

In S3, optimizer 134 optimizes the fleet. The optimization may be carried out in a number of different ways.

In one embodiment, in S3A(i), weight assigner 136 determines (and assigns) a usage weighting factor ($w_{ij}$) to each measurement system (i) for each application representative of a time the measurement system (i) spends performing a particular application (j) while (via rule enforcer 138) calculating (enforcing) at least one usage enforcement rule. Conventionally, FMP was calculated using equal weighting of TMP for each measurement system. However, this does not address the situation where other measurement systems pick up the slack for tools that are excluded from use or are not used fully. A usage weighting factor ($w_{ij}$) of zero for a particular application indicates that a measurement system is not employed for that particular application.

One challenge relative to calculating the usage weighting factors is warranting that each measurement system is optimally used and each application is adequately covered. That is, if a measurement system is not used for a particular application, weight assigner 136 and rule enforcer 138 should warrant that it is used for other applications for which it would be helpful. Furthermore, each application has a coverage requirement, e.g., to maintain a production rate, quality assurance, etc., which must be met by the fleet of measurement systems. In S3A(ii), rule enforcer 138 calculates (and enforces) at least one enforcement rule that mandates these situations are addressed. In one embodiment, two enforcement (sum) rules may be defined for these weighting factors ($w_{ij}$). For a measurement system to be properly utilized, the sum of all of its usage weighting factors ($w_{ij}$) must equal the measurement system weight $M_i$. That is:

$$\sum_{j=1}^{M} w_{ij} = M_i \qquad \text{(Eqn. 1)}$$

Enforcement of this enforcement rule ensures that a measurement system excluded or not fully employed from an application is not idle, i.e., it is being adequately used for another application, and/or measurement systems for the application are adequately compensating for the excluded or diminished use measurement system. For an application's need for measurements to be properly covered, the sum of all of measurement system usage weighting factors ($w_{ij}$) for application (j) must equal the application weight $N_j$, that is:

$$\sum_{i=1}^{N} w_{ij} = N_j. \qquad \text{(Eqn. 2)}$$

Enforcement of this enforcement rule ensures that an application's needs are met.

In one embodiment, the usage weighting factor ($w_{ij}$) is initially determined by measuring the time the measurement system (i) spends performing a particular application (j). The measurement system weights ($M_i$) are then calculated according to the following equation:

$$M_i = \sum_{j=1}^{M} w_{ij} \quad \text{(Eqn. 1)}$$

and the application weights ($N_j$) are calculated according to the following equation:

$$N_j = \sum_{i=1}^{N} w_{ij}. \quad \text{(Eqn. 2)}$$

Although two usage enforcement rules have been illustrated, it is understood that other rules may also be employed. For example, another usage enforcement rule may mandate that no usage weighting factors that result in a normalized FMP metric exceeds a threshold, i.e., $(FMP_j/T_j)_{ras}$<threshold.

In S3B(i), FMP calculator 140 calculates a weighted FMP metric for each application to which the fleet is exposed based on the usage weighting factors ($w_{ij}$). As stated above, the weighted FMP metric provides an indication of the fleet's overall measurement precision for a given application (j) based on usage weighting factors. The weighted FMP metric is equivalent to a root average square of the TMP for each measurement system (i) used for application (j) and weighted based on a usage weighting factor. The following equation represents the weighted FMP metric:

$$FMP_j = \sqrt{\frac{1}{N_j} \sum_{i=1}^{N} w_{ij} TMP_{ij}^2} \quad \text{(Eqn. 3)}$$

where $FMP_j$ is the weighted FMP metric for application (j), N is the number of measurement systems in the fleet, $w_{ij}$ is a usage weighting factor for measurement system (i) for application (j), and $TMP_{ij}$ is a TMP for measurement system (i) for application (j).

In addition, at S3B(ii), FMP calculator 140 calculates a normalized FMP metric, which normalizes FMP across different applications for the fleet. As noted above, the normalized FMP metric is equivalent to a root weighted average square of the weighted FMP metric ($FMP_j$) divided by the application tolerance ($T_j$) across all applications. That is:

$$\left(\frac{FMP}{T}\right)_{ras} = \sqrt{\frac{\sum_{j=1}^{M} N_j (FMP_j/T_j)^2}{\sum_{j=1}^{M} N_j}}. \quad \text{(Eqn. 5)}$$

where $(FMP/T)_{ras}$ is the normalized FMP metric, M is the total number of applications to which the fleet will be exposed, $FMP_j$ is the FMP for application (j), $N_j$ is the application weight for application (j), and $T_j$ is the application tolerance for application (j).

In step S3C, minimizer 142 re-assigns the usage weighting factors by invoking weight assigner 136 to minimize the normalized FMP metric for all applications while rule enforcer 138 enforces the at least one usage enforcement rule. In this regard, different combinations of usage weighting factors ($w_{ij}$) are considered in order to optimize the fleet. The smallest possible value of the normalized FMP metric corresponds to the optimized weighting combination.

In one embodiment, at S3D, the above-described embodiment may be simplified by identifier 144 identifying at least one 'exclusion measurement system' to exclude from the fleet based on the normalized TMP metrics, i.e., by assigning the exclusion measurement system(s) a value of zero. Although S3D is shown at the end of the above-described methodology, the order of functions may vary and the identification may occur earlier than indicated. This identification may be carried out in a number of ways. However, the overall effect is that the identification reduces the computational burden by identifying particular measurement systems for particular applications, where measurement system exclusion may have an impact. In this manner, the optimization can be restricted to explore only usage weighting factors ($w_{ij}$) not set to zero. In one embodiment, identifier 144 may identify at least one exclusion measurement system based on the at least one exclusion measurement system having a substantially dissimilar normalized TMP metric compared to other measurement systems in the fleet. Based on this identification, weight assigner 136 (with rule enforcer 138) may assign the at least one exclusion measurement system the usage weighting factor of zero, i.e., not employ the exclusion measurement system for a particular application.

In one embodiment, identifier 144 may implement a significance test to ensure that optimization operates only on real differences in the normalized TMP metric among the measurement systems. In particular, the significance test may be implemented by the use of Bartlett's test, as disclosed in: George Snedecor and William Cochran, Statistical Methods, Iowa State University Press, 1967, pp. 296-298, and Acheson Duncan, Quality Control and Industrial Statistics, Richard D. Irwin, Inc., 1965, pp. 641-644. This statistical test is a strong function of the sample size used to determine the TMP metric. If all the TMP metrics to be tested have the same sample size, the Bartlett test can be bypassed by using the simpler F-test on the largest and smallest TMP in the fleet, and then the next smallest in an iterative fashion.

In an alternative embodiment, binning may be employed. Binning is a process of constructing a discrete set of possible values for the normalized TMP with separations between adjacent values that is greater than the assessment uncertainty. For example, if each normalized TMP is uncertain to +/−1%, then binning may construct bins separated by 2%, such as the sequence 0,2,4,6,8,10, etc., and change each determined normalized TMP value to the nearest bin value.

The following is a simplified example of the above-described methodology. Consider a fleet of 10 measurement systems and 5 application families, as shown in table 1. An "application family" is a group of applications that have very similar measurement requirements so a single normalized TMP metric applies to the family. Initially, all measurement systems are considered equally good and so are assigned equal weighting factors of one, i.e., unity. This then establishes the enforcement rules as requiring all rows must sum to 10 and all columns must sum to 5. As shown in table 1, in this example, all normalized TMP metric values (TMP/T) are 20% except for two measurement systems: measurement system 5 for application family 3 and measurement system 6 for application family 4. Hence, these measurement systems are identified as exclusion measurement systems. For comparison purposes, a weighted FMP metric (Wt FMP/T) value for each application is calculated with equal weighting for all measurement systems, i.e., not employing the above-described methodology, and is shown in table 1. As indicated, because of the exclusion measurement systems, applications 3 and 4 have undesirable normalized FMP metric (FMP/T) values. Hence, for applications 3 and 4, the fleet matching is poor compared to the other applications. A normalized FMP metric ($(FMP/T)_{ras}$) for the fleet across all applications is 21.1.

TABLE 1

100 * TMP/T

| Applications | Measurement Systems | | | | | | | | | | Wt FMP/T |
|---|---|---|---|---|---|---|---|---|---|---|---|
| | 1 | 2 | 3 | 4 | 5 | 6 | 7 | 8 | 9 | 10 | |
| 1 | 20 | 20 | 20 | 20 | 20 | 20 | 20 | 20 | 20 | 20 | 20 |
| 2 | 20 | 20 | 20 | 20 | 20 | 20 | 20 | 20 | 20 | 20 | 20 |
| 3 | 20 | 20 | 20 | 20 | 40 | 20 | 20 | 20 | 20 | 20 | 22.8 |
| 4 | 20 | 20 | 20 | 20 | 20 | 40 | 20 | 20 | 20 | 20 | 22.8 |
| 5 | 20 | 20 | 20 | 20 | 20 | 20 | 20 | 20 | 20 | 20 | 20 |
| | | | | | | | | | | $(FMP/T)_{ras}$ | 21.1 |

The following table of usage weighting factors was calculated to exclude the two measurement systems from the application where each has a larger normalized TMP metric (TMP/T). The weighting factors for the other cases were chosen to equally weight other applications for the two measurement systems and then adjust weights for the other eight measurement systems across applications to ensure the usage enforcement rules are obeyed. These values are close to what would be achieved if, after excluding each of the two measurement systems from its problem application, product is sent to measurement systems based on availability.

TABLE 2

Usage Weighting Factors

| Applications | Measurement Systems | | | | | | | | | | Sum |
|---|---|---|---|---|---|---|---|---|---|---|---|
| | 1 | 2 | 3 | 4 | 5 | 6 | 7 | 8 | 9 | 10 | |
| 1 | 0.9 | 0.9 | 0.9 | 0.9 | 1.3 | 1.3 | 0.9 | 0.9 | 0.9 | 0.9 | 10 |
| 2 | 0.9 | 0.9 | 0.9 | 0.9 | 1.3 | 1.3 | 0.9 | 0.9 | 0.9 | 0.9 | 10 |
| 3 | 1.1 | 1.1 | 1.1 | 1.1 | 0 | 1.3 | 1.1 | 1.1 | 1.1 | 1.1 | 10 |
| 4 | 1.1 | 1.1 | 1.1 | 1.1 | 1.3 | 0 | 1.1 | 1.1 | 1.1 | 1.1 | 10 |
| 5 | 0.9 | 0.9 | 0.9 | 0.9 | 1.3 | 1.3 | 0.9 | 0.9 | 0.9 | 0.9 | 10 |
| Sum | 5 | 5 | 5 | 5 | 5 | 5 | 5 | 5 | 5 | 5 | |

The values in the column and row called "sum" indicates the usage enforcement rules are being obeyed.

The following table calculates the weighted FMP metrics (Wt FMP/T) and the normalized FMP metric ($(FMP/T)_{ras}$) for the fleet according to the above-described methodology.

TABLE 3

| Applications | Wt FMP/T |
|---|---|
| 1 | 20 |
| 2 | 20 |
| 3 | 20 |
| 4 | 20 |
| 5 | 20 |
| $(FMP/T)_{ras}$ | 20 |

Comparing the results from table 1 and table 3, as a consequence of exclusion measurement systems' exclusion, the weighted FMP metrics values are all acceptable and the overall normalized FMP metric for the fleet across all applications has been lowered as well. It is understood that due to the simplicity of this example, where all TMP/T values are equal except for two, that there is not a unique solution. It is not necessary that there is a unique solution, so long as the optimization can find a weighting that significantly improves the overall normalized FMP.

Figure 3:
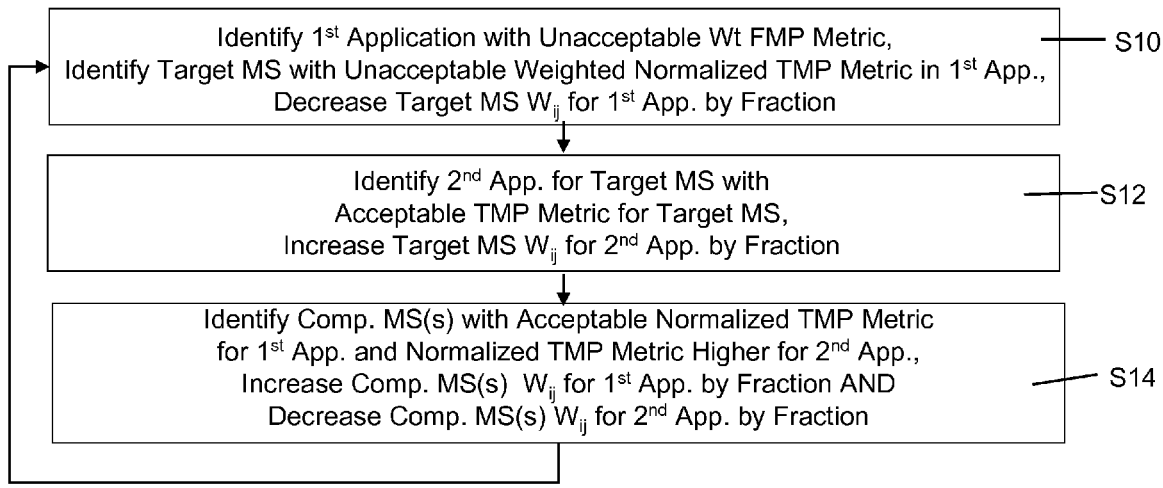
FIG. 3 shows a flow diagram of one embodiment of an identifier of the system of FIG. 1.

In an alternative embodiment, at S3D, identifier 144 may implement a repeating identification process. Referring to FIG. 3, in this process, at S10, identifier 144 first identifies a first application having an unacceptable weighted FMP metric (e.g., too high compared to other measurement systems) and a target measurement system used for the first application having an unacceptable weighted normalized TMP metric when multiplied by a square root of a current usage weighting factor $w_{ij}$. Weight assigner 136 assigns a new usage weighting factor by decreasing a current usage weighting factor for the target measurement system for the first application by a weighting factor correction fraction, i.e., by a fraction of one (unity) or less. Hence, usage of the target measurement system is diminished. Next, at S12, identifier 144 identifies a second application for the target measurement system having an acceptable normalized TMP metric (e.g., within a threshold of other applications) among the applications that the target measurement system performs. Weight assigner 136 adjusts a current usage weighting factor for the target measurement system for the second application by adding the weighting factor correction fraction. Hence, the amount by which the target measurement system's use was diminished for the first application is used for the second application. At S14, identifier 144 identifies at least one compensating measurement system having a normalized TMP metric that is acceptable for the first application and a normalized TMP metric that is higher for the second application. These compensating measurement systems compensate for the target measurement system for the first and second application. Weight assigner 136 then distributes the weighting factor correction fraction as additions to the usage weighting factors for the compensating measurement system(s) for the first application and as subtractions to the usage weighting factors for the compensating measurement system(s) for the second application. That is, the amount by which the target application is diminished for the first application is assigned to at least one compensating measurement system for the first application, and the amount by which the target measurement system usage increases for the second application acts to reduce usage of the compensating measurement systems for the second application. Each usage weighting factor assignment also includes rule enforcer 138 enforcing the at least one usage enforcement rules. This process may repeat, as shown in FIG. 3, numerous times until no further benefit results or until the normalized FMP metric goals have been met.

The following example illustrates use of this process. Consider as an example for illustration a fleet of 10 tools supporting 5 applications. In this example, the weighting factor correction fraction for the target measurement system for the first application is one, i.e., unity. Also, the initial usage weighting factors assume all the tools perform equally well so the factors are all equal. This is shown in Table 4. These sums for the rows and columns in this table establish the enforcement rule constraints that must be enforced through each pass of the optimization. Furthermore, the compensating measurements systems total one.

TABLE 4

Initial Usage Weighting Factors

| Applications | Tools | | | | | | | | | | Sum |
|---|---|---|---|---|---|---|---|---|---|---|---|
| | 1 | 2 | 3 | 4 | 5 | 6 | 7 | 8 | 9 | 10 | |
| 1 | 1 | 1 | 1 | 1 | 1 | 1 | 1 | 1 | 1 | 1 | 10 |
| 2 | 1 | 1 | 1 | 1 | 1 | 1 | 1 | 1 | 1 | 1 | 10 |
| 3 | 1 | 1 | 1 | 1 | 1 | 1 | 1 | 1 | 1 | 1 | 10 |
| 4 | 1 | 1 | 1 | 1 | 1 | 1 | 1 | 1 | 1 | 1 | 10 |
| 5 | 1 | 1 | 1 | 1 | 1 | 1 | 1 | 1 | 1 | 1 | 10 |
| Sum | 5 | 5 | 5 | 5 | 5 | 5 | 5 | 5 | 5 | 5 | |

Further consider as an example for illustration the set of normalized TMP metrics (TMP/T) generated by a random number generator to produce a uniform distribution from 10 to 30 shown in Table 5.

TABLE 5

100 * TMP/T

| Applications | Tools | | | | | | | | | |
|---|---|---|---|---|---|---|---|---|---|---|
| | 1 | 2 | 3 | 4 | 5 | 6 | 7 | 8 | 9 | 10 |
| 1 | 18 | 12 | 22 | 28 | 28 | 29 | 10 | 18 | 27 | 13 |
| 2 | 15 | 11 | 11 | 13 | 14 | 10 | 16 | 17 | 21* | 17 |
| 3 | 17 | 17 | 28 | 19 | 19 | 16 | 30 | 26 | 30 | 15 |
| 4 | 29 | 11 | 24 | 26 | 29 | 19 | 16 | 25 | 17* | 26 |
| 5 | 11 | 14 | 11 | 17 | 20 | 20 | 17 | 30 | 11 | 15 |

Note that the TMP/T values are listed as percent. Using the usage weighting factors of Table 4 and the TMP/T values of Table 5, the weighted FMP/T values for all applications can be calculated according to Eqn. 3 and the normalized FMP for the fleet can be calculated according to Eqn. 5. These are given in Table 6.

TABLE 6

Initial FMP Results

| Applications | FMP/T |
|---|---|
| 1 | 21.64 |
| 2 | 14.86 |
| 3 | 22.45 |
| 4 | 22.94 |
| 5 | 17.50 |
| $(FMP/T)_{ras}$ | 20.13 |

Executing the above-described embodiment, referring to FIG. 3, in S10, identifier 144 identifies measurement system 5 as a target measurement system by application 4 and decreases the current usage weighting factor by a weighting factor correction fraction. In this case, it is decreased to zero. At S12, identifier 144 identifies application 2 for target measurement system 5 and increases the current usage weighting factor by a weighting factor correction fraction, here 1. In this case, the usage weighting factor for measurement system 5 for application 2 is increased to 2. At S14, identifier 144 identifies measurement system 9 by applications 2 and 4 as a compensating measurement system for rebalancing the usage weighting factors that were set to 0 and 2, respectively. These selections are illustrated with an asterisk in Table 5. The resulting distribution of the weighting factor correction fraction as additions to the usage weighting factors for the compensating measurement system(s) for the first application and as subtractions to the usage weighting factors for the compensating measurement system(s) for the second application is shown in Table 7.

TABLE 7

First Pass Usage Weighting Factors

| Applications | Tools | | | | | | | | | | Sum |
|---|---|---|---|---|---|---|---|---|---|---|---|
| | 1 | 2 | 3 | 4 | 5 | 6 | 7 | 8 | 9 | 10 | |
| 1 | 1 | 1 | 1 | 1 | 1 | 1 | 1 | 1 | 1 | 1 | 10 |
| 2 | 1 | 1 | 1 | 1 | 2 | 1 | 1 | 1 | 0 | 1 | 10 |
| 3 | 1 | 1 | 1 | 1 | 1 | 1 | 1 | 1 | 1 | 1 | 10 |
| 4 | 1 | 1 | 1 | 1 | 0 | 1 | 1 | 1 | 2 | 1 | 10 |
| 5 | 1 | 1 | 1 | 1 | 1 | 1 | 1 | 1 | 1 | 1 | 10 |
| Sum | 5 | 5 | 5 | 5 | 5 | 5 | 5 | 5 | 5 | 5 | |

Based on the first pass weighting factors in Table 7 and the normalized TMP metrics in Table 5, first pass weighted FMP/T values can now be calculated. These are shown in Table 8.

TABLE 8

First Pass FMP Results

| Applications | Wt FMP/T |
|---|---|
| 1 | 21.64 |
| 2 | 14.01 |
| 3 | 22.45 |
| 4 | 21.70 |
| 5 | 17.50 |
| $(FMP/T)_{ras}$ | 19.73 |

This process may then repeat 5 more times, in this example, to reduce all weighted FMP metrics to less than 20. The final usage weighting factors are shown in Table 9, and the final weighted FMP results are in shown in Table 10.

TABLE 9

Six Pass Usage Weighting Factors

| Applications | Tools | | | | | | | | | | Sum |
|---|---|---|---|---|---|---|---|---|---|---|---|
| | 1 | 2 | 3 | 4 | 5 | 6 | 7 | 8 | 9 | 10 | |
| 1 | 1 | 1 | 0 | 1 | 1 | 0 | 1 | 2 | 1 | 2 | 10 |
| 2 | 1 | 1 | 1 | 1 | 2 | 2 | 1 | 1 | 0 | 0 | 10 |
| 3 | 1 | 1 | 1 | 1 | 1 | 2 | 0 | 1 | 0 | 2 | 10 |
| 4 | 0 | 2 | 1 | 1 | 0 | 1 | 2 | 1 | 2 | 0 | 10 |
| 5 | 2 | 0 | 2 | 1 | 1 | 0 | 1 | 0 | 2 | 1 | 10 |
| Sum | 5 | 5 | 5 | 5 | 5 | 5 | 5 | 5 | 5 | 5 | |

TABLE 10

Sixth Pass FMP Results

| Applications | Wt FMP/T |
|---|---|
| 1 | 19.62 |
| 2 | 13.32 |
| 3 | 19.29 |
| 4 | 18.89 |
| 5 | 13.89 |
| $(FMP/T)_{ras}$ | 17.23 |

In this example, all of the resulting weighted FMP metrics have been reduced to less than 20, and an overall normalized FMP metric has been reduced from 20.13 to 17.23. Each value indicates improved fleet matching.

It is also understood that in the above examples, there may be literally hundreds or even thousands of applications, but in practice, these numbers can be reduced to a small number of families. For example, in a semiconductor device fabricator, the applications may be reduced to etch linewidth-like measurements, resist contact hole-like measurements, space-width with embedded charge-like measurements, etc. Similar reductions may be possible in other manufacturers.

IV. CONCLUSION

As discussed herein, various systems and components are described as "obtaining" data (e.g., obtainer 130, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for optimize a fleet of measurement systems, it is understood that the invention further provides various alternative embodiments. For example, in one embodiment, the invention provides a program product stored on a computer-readable medium, which when executed, enables a computer infrastructure to optimize a fleet of measurement systems. To this extent, the computer-readable medium includes program code, such as optimization system 106 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.), on paper (e.g., capable of being scanned in as electronic data), and/or the like.

In another embodiment, the invention provides a method of generating a system for optimize a fleet of measurement systems. In this case, a computer infrastructure, such as computer infrastructure 102 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider, could offer to optimize a fleet of measurement systems as described herein. In this case, the service provider can manage (e.g., create, maintain, support, etc.) a computer infrastructure, such as computer infrastructure 102 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of optimizing a fleet of measurement systems, the method comprising:
 obtaining an application tolerance (T) for each application to which at least one measurement system of the fleet is to be exposed;
 determining a tool matching precision (TMP) for each measurement system in the fleet for each application to which a measurement system is exposed; and
 optimizing the fleet by:
  a) determining a usage weighting factor ($w_{ij}$) for each measurement system (i) for each application representative of a time the measurement system (i) spends performing a particular application (j) and calculating at least one usage enforcement rule,
  b) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors,
  c) calculating a normalized FMP metric, the normalized FMP metric equivalent to a root weighted average square of the weighted FMP metric divided by the application tolerance across all applications,
  d) re-assigning the usage weighting factors to minimize the normalized FMP metric for all applications while enforcing the at least one usage enforcement rule, and
  e) using the normalized FMP metric to adjust at least one measurement system.

2. The method of claim 1, wherein the at least one usage enforcement rule includes:

$$\sum_{j=1}^{M} w_{ij} = M_i, \quad \text{a)}$$

where M is a total number of applications and the measurement system weight ($M_i$) represents a time spent by measurement system (i) performing all applications; and $$\sum_{i=1}^{N} w_{ij} = N_j, \quad \text{b)}$$

where N is a total number of measurement systems in the fleet and application weight ($N_j$) represents a time spent by all measurement systems performing application (j).

3. The method of claim 1, wherein the at least one enforcement rule includes mandating that the normalized FMP metric is less than a threshold.

4. The method of claim 1, wherein the optimizing further includes:
calculating a normalized TMP metric for each measurement system, the normalized TMP metric equivalent to the TMP of the measurement system for a particular application divided by the application tolerance for the particular application; and
identifying at least one measurement system for one application to reduce the usage weighting factor based on the normalized TMP metrics.

5. The method of claim 4, wherein the identifying includes:
identifying the at least one exclusion measurement system based on the at least one exclusion measurement system having a substantially dissimilar normalized TMP metric compared to other measurement systems in the fleet; and
wherein the assigning includes assigning the at least one exclusion measurement system the usage weighting factor of zero.

6. The method of claim 4, wherein the identifying includes:
first identifying a first application having an unacceptable weighted FMP metric and a target measurement system used for the first application having an unacceptable normalized TMP metric when multiplied by a square root of the usage weighting factor, and wherein the assigning includes decreasing the usage weighting factor by a weighting factor correction fraction of a current usage weighting factor;
second identifying a second application for the target measurement system having an acceptable normalized TMP metric among the applications that the target measurement system performs, and wherein the assigning includes adjusting the usage weighting factor for the target measurement system for the second application by adding the weighting factor correction fraction;
third identifying at least one compensating measurement systems having a normalized TMP metric that is acceptable for the first application and a normalized TMP metric that is higher for the second application, and wherein the assigning includes distributing the weighting factor correction fraction as additions to the usage weighting factors for the at least one compensating measurement system for the first application and as subtractions to the usage weighting factors for the at least one compensating measurement system for the second application in such a way as to enforce the enforcement rules.

7. The method of claim 6, further comprising repeating the first, second and third identifying.

8. A system for optimizing a fleet of measurement systems, the method comprising:
an obtainer for obtaining an application tolerance (T) for each application to which at least one measurement system of the fleet is to be exposed;
a tool matching precision (TMP) determinator for determining a tool matching precision (TMP) for each measurement system in the fleet for each application to which a measurement system is exposed; and
an optimizer for optimizing the fleet, the optimizer including:
a) a weight assigner for determining a usage weighting factor ($w_{ij}$) for each measurement system (i) for each application representative of a time the measurement system (i) spends performing a particular application (j) and calculating at least one usage enforcement rule,
b) a fleet measurement precision (FMP) calculator for:
i) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors, and
ii) calculating a normalized FMP metric, the normalized FMP metric equivalent to a root weighted average square of the weighted FMP metric divided by the application tolerance across all applications; and
c) a minimizer for invoking the weight assigner to re-assign the usage weighting factors to minimize the normalized FMP metric for all applications while enforcing the at least one usage enforcement rule, and
d) using the normalized FMP metric to adjust at least one measurement system.

9. The system of claim 8, wherein the at least one usage enforcement rule includes:

$$\sum_{j=1}^{M} w_{ij} = M_i, \quad \text{a)}$$

where M is a total number of applications and the measurement system weight ($M_i$) represents a time spent by measurement system (i) performing all applications; and $$\sum_{i=1}^{N} w_{ij} = N_j, \quad \text{b)}$$

where N is a total number of measurement systems in the fleet and application weight ($N_j$) represents a time spent by all measurement systems performing application (j).

10. The system of claim 8, wherein the at least one enforcement rule mandates that the normalized FMP metric is less than a threshold.

11. The system of claim 8, wherein the TMP calculator further calculates a normalized TMP metric for each measurement system, the normalized TMP metric equivalent to the TMP of the measurement system for a particular application divided by the application tolerance for the particular application; and further comprising an identifier for identifying at least one measurement system for one application to reduce the usage weighting factor based on the normalized TMP metrics.

12. The system of claim 11, wherein the identifier identifies the at least one exclusion measurement system based on the at least one exclusion measurement system having a substantially dissimilar normalized TMP metric compared to other measurement systems in the fleet; and wherein the weight assigner assigns the at least one exclusion measurement system the usage weighting factor of zero.

13. The system of claim 11, wherein the identifier:

first identifying a first application having an unacceptable weighted FMP metric and a target measurement system used for the first application having an unacceptable normalized TMP metric when multiplied by a square root of the usage weighting factor, and wherein the assigning includes decreasing the usage weighting factor by a weighting factor correction fraction of a current usage weighting factor;

second identifying a second application for the target measurement system having an acceptable normalized TMP metric among the applications that the target measurement system performs, and wherein the assigning includes adjusting the usage weighting factor for the target measurement system for the second application by adding the weighting factor correction fraction; and third identifying at least one compensating measurement systems having a normalized TMP metric that is acceptable for the first application and a normalized TMP metric that is higher for the second application, and wherein the assigning includes distributing the weighting factor correction fraction as additions to the usage weighting factors for the at least one compensating measurement system for the first application and as subtractions to the usage weighting factors for the at least one compensating measurement system for the second application in such a way as to enforce the enforcement rules.

14. The system of claim 13, wherein the identifier repeats the first, second and third identifying.

15. A program product stored on a computer-readable medium, which when executed, optimizes a fleet of measurement systems, the program product comprising:

program code for obtaining an application tolerance (T) for each application to which at least one measurement system of the fleet is to be exposed;

program code for determining a tool matching precision (TMP) for each measurement system in the fleet for each application to which a measurement system is exposed; and program code for optimizing the fleet, the optimizing program code including:

a) program code for determining a usage weighting factor ($w_{ij}$) for each measurement system (i) for each application representative of a time the measurement system (i) spends performing a particular application (j) and calculating at least one usage enforcement rule, b) program code for:

i) calculating a weighted fleet measurement precision (FMP) metric for each application to which the fleet is exposed based on the usage weighting factors, the weighted FMP metric equivalent to a root average square of the TMP of each measurement system used for the application and weighted based on the usage weighting factors, and ii) calculating a normalized FMP metric, the normalized FMP metric equivalent to a root weighted average square of the weighted FMP metric divided by the application tolerance across all applications; and c) program code for invoking the weight assigner to re-assign the usage weighting factors to minimize the normalized FMP metric for all applications while enforcing the at least one usage enforcement, and d) using the normalized FMP metric to adjust at least one measurement system.

16. The program product of claim 15, wherein the at least one usage enforcement rule includes:

$$\sum_{j=1}^{M} w_{ij} = M_i, \qquad \text{a)}$$

where M is a total number of applications and the measurement system weight ($M_i$) represents a time spent by measurement system (i) performing all applications; and $$\sum_{i=1}^{N} w_{ij} = N_j, \qquad \text{b)}$$

where N is a total number of measurement systems in the fleet and application weight ($N_j$) represents a time spent by all measurement systems performing application (j).

17. The program product of claim 15, wherein the TMP determining program code further calculates a normalized TMP metric for each measurement system, the normalized TMP metric equivalent to the TMP of the measurement system for a particular application divided by the application tolerance for the particular application; and the optimizing program code further includes:

program code for identifying at least one exclusion measurement system to exclude from the fleet based on the normalized TMP metrics.

18. The program product of claim 17, wherein the identifying program code identifies the at least one exclusion measurement system based on the at least one exclusion measurement system having a substantially dissimilar normalized TMP metric compared to other measurement systems in the fleet; and wherein the weight assigning program code assigns the at least one exclusion measurement system the usage weighting factor of zero.

19. The program product of claim 17, wherein the identifying program code:

first identifying a first application having an unacceptable weighted FMP metric and a target measurement system used for the first application having an unacceptable normalized TMP metric when multiplied by a square root of the usage weighting factor, and wherein the assigning includes decreasing the usage weighting factor by a weighting factor correction fraction of a current usage weighting factor;

second identifying a second application for the target measurement system having an acceptable normalized TMP metric among the applications that the target measurement system performs, and wherein the assigning includes adjusting the usage weighting factor for the target measurement system for the second application by adding the weighting factor correction fraction; and third identifying at least one compensating measurement systems having a normalized TMP metric that is acceptable for the first application and a normalized TMP metric that is higher for the second application, and wherein the assigning includes distributing the weighting factor correction fraction as additions to the usage weighting factors for the at least one compensating measurement system for the first application and as subtractions to the usage weighting factors for the at least one compensating measurement system for the second application in such a way as to enforce the enforcement rules.

20. The program product of claim 19, wherein the identifying program code repeats the first, second and third identifying.

* * * * *